(12) United States Patent
Sivinski

(10) Patent No.: US 10,765,055 B2
(45) Date of Patent: Sep. 8, 2020

(54) GREASELESS BUSHING FOR AGRICULTURAL ROW UNIT

(71) Applicant: Harvest International, Inc., Storm Lake, IA (US)

(72) Inventor: Jeffrey Alan Sivinski, Cherokee, IA (US)

(73) Assignee: Harvest International, Inc., Storm Lake, IA (US)

( * ) Notice: Subject to any disclaimer, the term of this patent is extended or adjusted under 35 U.S.C. 154(b) by 271 days.

(21) Appl. No.: 15/896,225

(22) Filed: Feb. 14, 2018

(65) Prior Publication Data

US 2018/0228076 A1 Aug. 16, 2018

Related U.S. Application Data

(60) Provisional application No. 62/458,927, filed on Feb. 14, 2017.

(51) Int. Cl.

| | | |
|---|---|---|
| *A01B 71/04* | (2006.01) | |
| *A01C 5/06* | (2006.01) | |
| *F16C 17/02* | (2006.01) | |
| *F16C 33/72* | (2006.01) | |
| *A01C 7/20* | (2006.01) | |
| *F16C 33/74* | (2006.01) | |
| *F16C 33/20* | (2006.01) | |

(52) U.S. Cl.
CPC .............. *A01B 71/04* (2013.01); *A01C 5/064* (2013.01); *A01C 7/201* (2013.01); *F16C 17/02* (2013.01); *F16C 33/723* (2013.01); *F16C 33/20* (2013.01); *F16C 33/74* (2013.01); *F16C 2226/60* (2013.01); *F16C 2310/00* (2013.01)

(58) Field of Classification Search
CPC ......... A01B 71/04; A01B 71/00; F16C 33/20; F16C 33/74; F16C 17/02; F16C 17/00; F16C 33/723; F16C 33/72; F16C 33/00; F16C 33/04; F16C 33/02; F16C 2226/60; F16C 2226/50; F16C 2226/00; F16C 2310/00; A01C 5/064; A01C 5/062; A01C 5/06; A01C 5/00; A01C 7/201; A01C 7/20; A01C 7/00
See application file for complete search history.

(56) References Cited

U.S. PATENT DOCUMENTS

| | | | | |
|---|---|---|---|---|
| 2,626,839 | A * | 1/1953 | Creson | F16C 33/74 |
| | | | | 277/572 |
| 3,441,288 | A * | 4/1969 | Boughner | B62D 7/18 |
| | | | | 280/93.512 |
| 3,843,216 | A * | 10/1974 | Campbell | F16C 33/20 |
| | | | | 384/152 |
| 6,082,721 | A * | 7/2000 | Kingsley | F16B 11/008 |
| | | | | 267/276 |

(Continued)

*Primary Examiner* — Christopher J. Novosad
(74) *Attorney, Agent, or Firm* — McKee, Voorhees & Sease, PLC

(57) ABSTRACT

A greaseless bushing assembly for the gauge wheel arms of an agricultural row planter. The greaseless bushing includes an outer threaded tube for threaded mounting within the gauge wheel arm, and an internal non-metallic sleeve through which the wheel bolt extends for mounting the gauge wheel onto the arm. The sleeve provides dry lubrication for the bushing. The bushing may also include a lip or wiper seal at each end to prevent entry of dust into the bushing.

18 Claims, 8 Drawing Sheets

(56) References Cited

U.S. PATENT DOCUMENTS

| | | | |
|---|---|---|---|
| 6,321,667 B1 | 11/2001 | Shoup | |
| 8,616,298 B2 | 12/2013 | Rylander | |
| 9,976,599 B2 * | 5/2018 | Richardson | ........... F16C 33/581 |
| 10,154,621 B2 * | 12/2018 | Schoolman | ............ A01B 71/04 |
| 2006/0093246 A1 | 5/2006 | Akita et al. | |

* cited by examiner

GREASELESS BUSHING FOR AGRICULTURAL ROW UNIT

CROSS-REFERENCE TO RELATED APPLICATIONS

This application claims priority to Provisional Application U.S. Ser. No. 62/458,927 filed on Feb. 14, 2017, which is herein incorporated by reference in its entirety.

BACKGROUND OF THE INVENTIONS

Row planter units are precision tools used in farming to plant high tech seeds at uniform depth and spacing to ensure the highest yield potential. To achieve maximum results, the row planter unit must be properly maintained and periodically adjusted.

Row planter units typically include a pair of angularly disposed opening discs to form a V-shaped opening or furrow in the soil into which seeds are planted. The disc openers are followed by a pair of gauge wheels that aid in holding the V-shaped profile of the furrow. The gauge wheels are parallel to and contact the disc openers when properly positioned. The gauge wheels are mounted on pivoting arms, which include bushings.

The bushings must be greased, preferably daily. The greasing operation takes considerable time on a multi-unit planter, particularly during the busy planting season. Conventional planters may have up to 71 row units, such that daily greasing of the bushings cuts into valuable and sometimes scarce planting time. Eliminating the greasing requirement and the time saving to farmers is a huge benefit. When lubrication is neglected, the rocking action of the gauge wheel arms generates substantial friction, which leads to wear on the bushings, which then causes the gauge wheel angles to change and the gauge wheels to move away from the disc openers. As the bushings wear, the disc openers spread apart, forming a gap between the disc openers, which leads to deterioration of the V-shaped seed furrow profile, which is extremely undesirable, and which ultimately adversely affects yield.

Therefore, a primary objective of the present invention is the provision of a greaseless bushing for the gauge wheels of an agricultural row unit.

Another objective of the present invention is the provision of an improved bushing for laterally adjustable gauge wheels on an agricultural row unit.

A further objective of the present invention is the provision of a greaseless bushing for the gauge wheels of a seed planter unit, wherein the bushing includes outer threads and an internal composite, non-metallic wear sleeve.

Still another objective of the present invention is a provision of a laterally adjustable dry lubricated bushing for use on the gauge wheel arm of an agricultural row unit.

Yet another objective of the present invention is the provision of a dry bushing for a row unit gauge wheel arm which eliminates dust attraction to the bushing.

A further objective of the present invention is a provision of a laterally adjustable bushing having seals to preclude dust from entering the bushing.

Another objective of the present invention is a provision of an improved bushing for gauge wheel arms on an agricultural unit, which minimizes maintenance of the bushing while increasing the life expectancy of the bushing.

Still another objective of the present invention is a provision of a bushing for use on the gauge wheel arms of agricultural row planters which eliminates the need for greasing.

Yet another objective of the present invention is the provision of a greaseless bushing for agricultural row planter gauge wheel arms which is economical to manufacture, easy to install, and durable in use.

These and other objectives have become apparent from the following description of the invention.

SUMMARY OF THE INVENTION

The bushing assembly of the present invention is intended for use on gauge wheel arms of an agricultural row planter. The bushing utilizes dry lubrication so as to be greaseless. The bushing comprises an outer threaded tube for threaded receipt in the gauge wheel arm, with an internal, non-metallic sleeve made of a low friction material. A bolt extends through the sleeve to mount the gauge wheel to the arm, with the bolt extending through the center sleeve of the bushing. The bushing is laterally adjustable within the gauge wheel arm via the threaded coupling and a jam nut.

In an alternative embodiment, the bushing includes seals at each end to preclude entry of dust into the bushing. Preferably, the seals are a wiper seal. The elimination of internal dust in the bushing extends the use of life of the bushing.

DETAILED DESCRIPTION OF THE INVENTION

Figure 1:
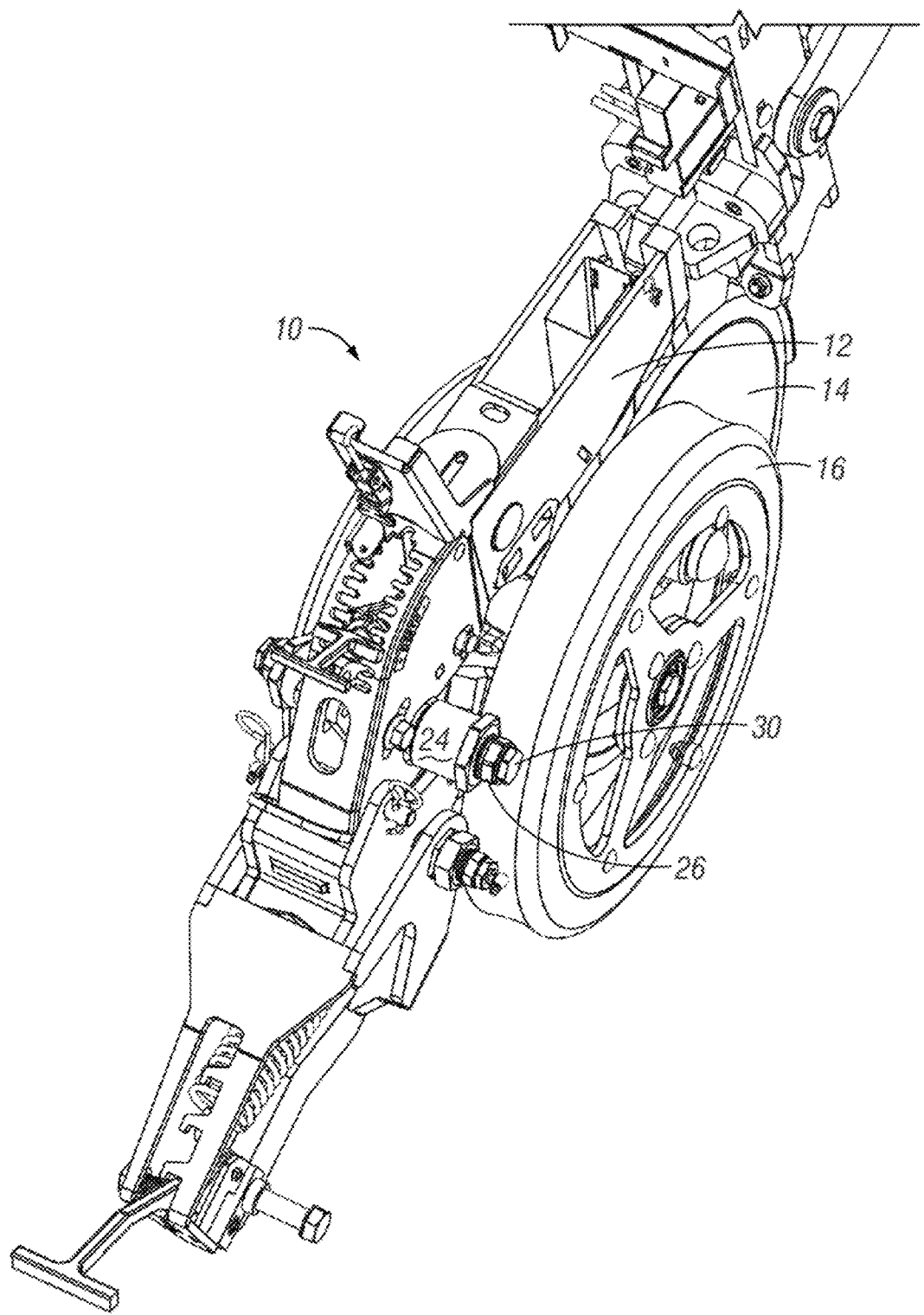
FIG. 1 is a perspective view of a row planter unit having adjustable gauge wheels, and the greaseless bushing of the present invention.

A row planter unit having the adjustable gauge wheels of the present invention is generally designated in the drawings by the reference numeral 10. The unit 10 includes a frame 12, a pair of disc openers (or opening discs) 14, a pair of gauge wheels 16, and a pair of closing wheels (not shown). The discs 14 and closing wheels 18 (not shown) are conventional, and do not form a part of the present invention.

Figure 2:
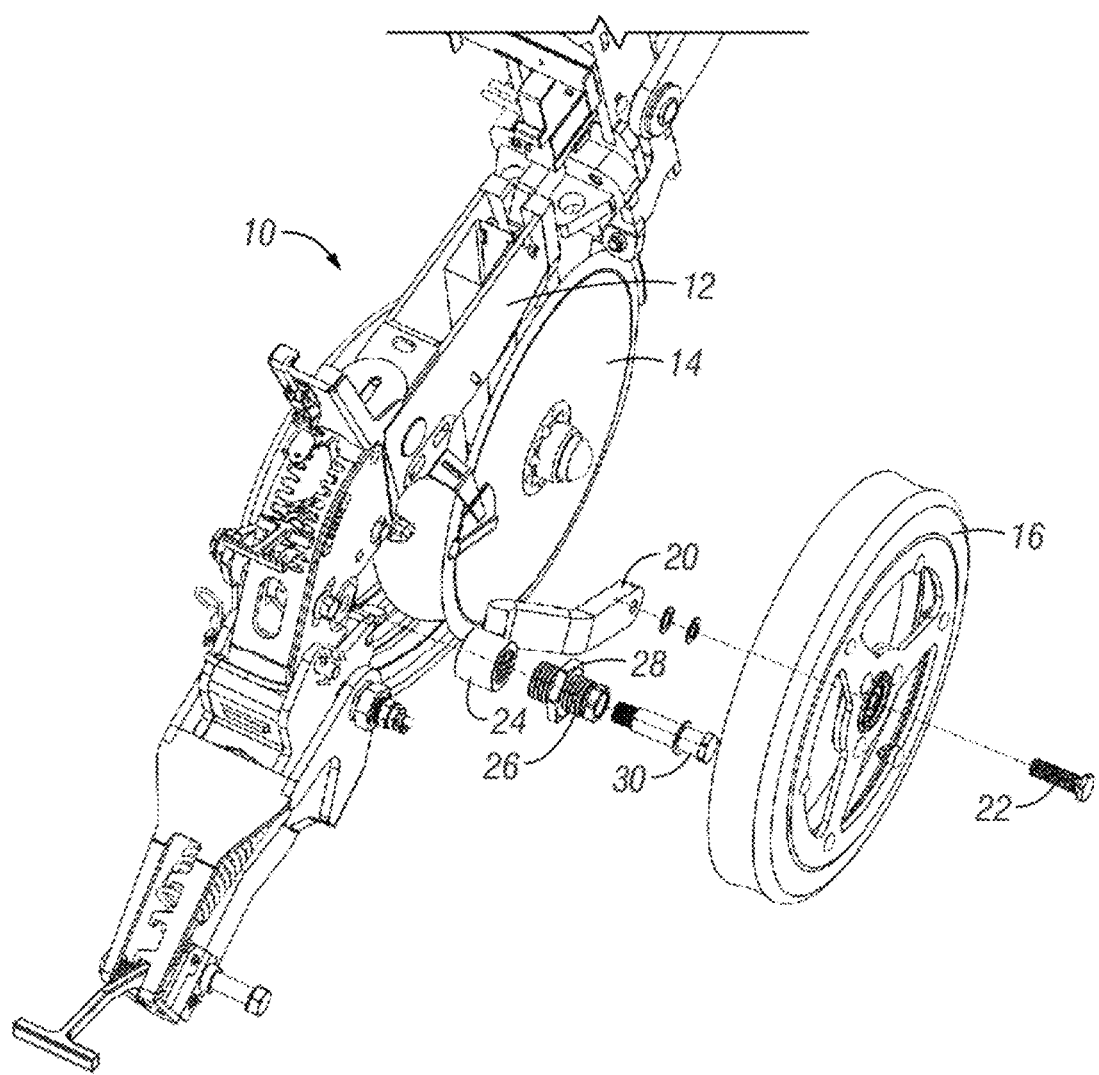
FIG. 2 is a partially exploded view of the row unit assembly shown in FIG. 1.

As best seen in the partial exploded view of FIG. 2, each gauge wheel 16 is mounted on an arm 20 via a bolt 22 which defines the rolling axis for the wheel. The upper end of the arm 20 has an internally threaded collar 24.

The present invention is directed to greaseless lateral adjustment bushing 26. The bushing 26 has external threads for receipt in the collar 24 of the arm 20. A lock nut 28 on the bushing 26 fixes the threaded position of the bushing 26 in the collar 24 of the arm 20. A pivot bolt 30 extends through the bushing 26 and has an inner end which is threadably received within a mounting shaft (not shown). The pivot bolt 30 allows the adjustment bushing 26, the fixed arm 20 and the gauge wheel 16 to pivot about the axis of the bolt 30 as the row unit travels through the field.

The opposite gauge wheel is similarly mounted to the opposite end of the mounting shaft (not shown) via a mirror image arm 20, adjustment bushing 26, and pivot bolt 30.

The adjustment bushing 26 includes an internal sleeve 34 made of a composite, non-metallic material. This low friction material eliminates the need to grease the bushing 26. Accordingly, the bolt 30 does not have a grease zerk, as in prior art bushings, such as that disclosed an Applicant's co-pending application 62/326,063 which is incorporated herein by reference. The inner wear sleeve 34 is pressed into the outer threaded bushing 26, thereby allowing the complete assembly to pivot on the gauge wheel arm pivot bolt 30. This assembly is then threaded into the gauge wheel arm 20 and locked into place with the jam nut 28. The nut 28 eliminates the lateral adjustment bushing assembly 26 from being able to thread in or out of the gauge wheel arm 20 during the rocking action of the gauge wheel arm during the planting process.

Figure 2A:
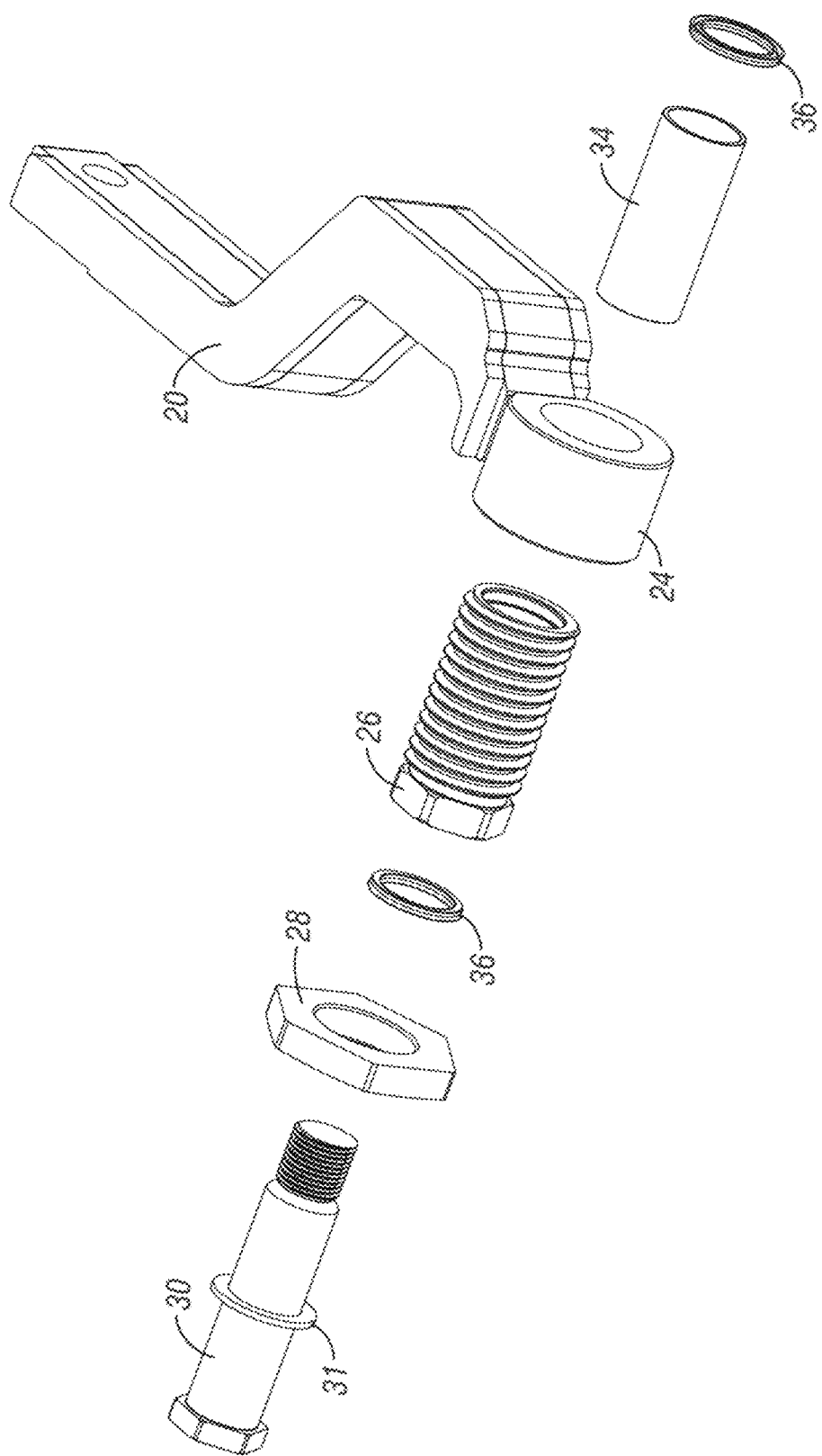
FIG. 2A is an exploded perspective view of another embodiment of the greaseless bushing according to the present invention.
Figure 3:
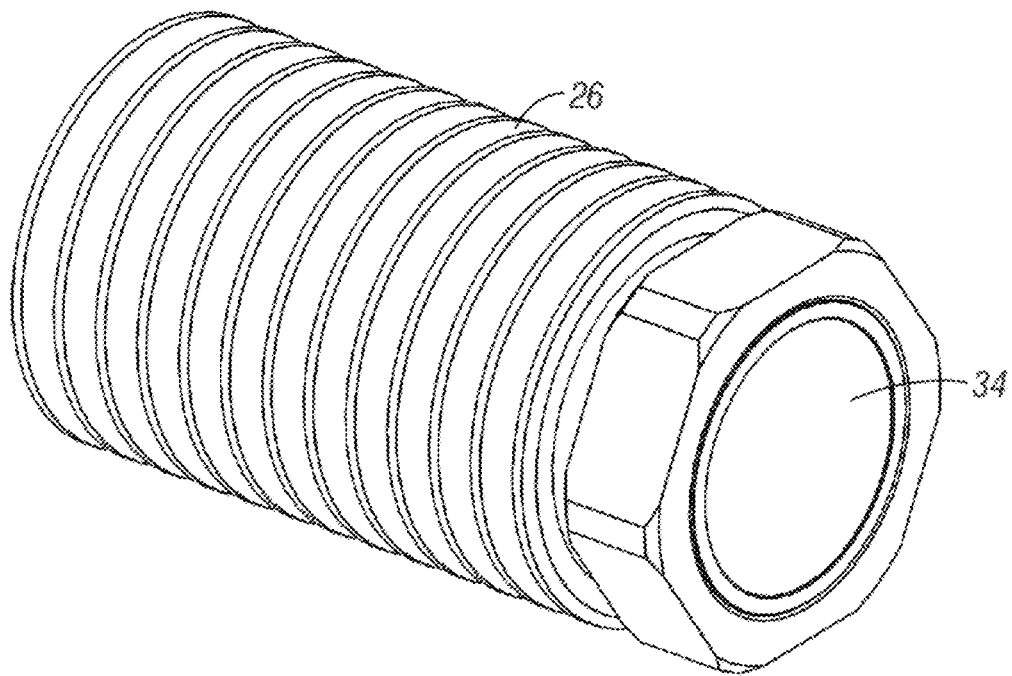
FIG. 3 is a perspective view of the greaseless bushing according to the present invention.
Figure 4:
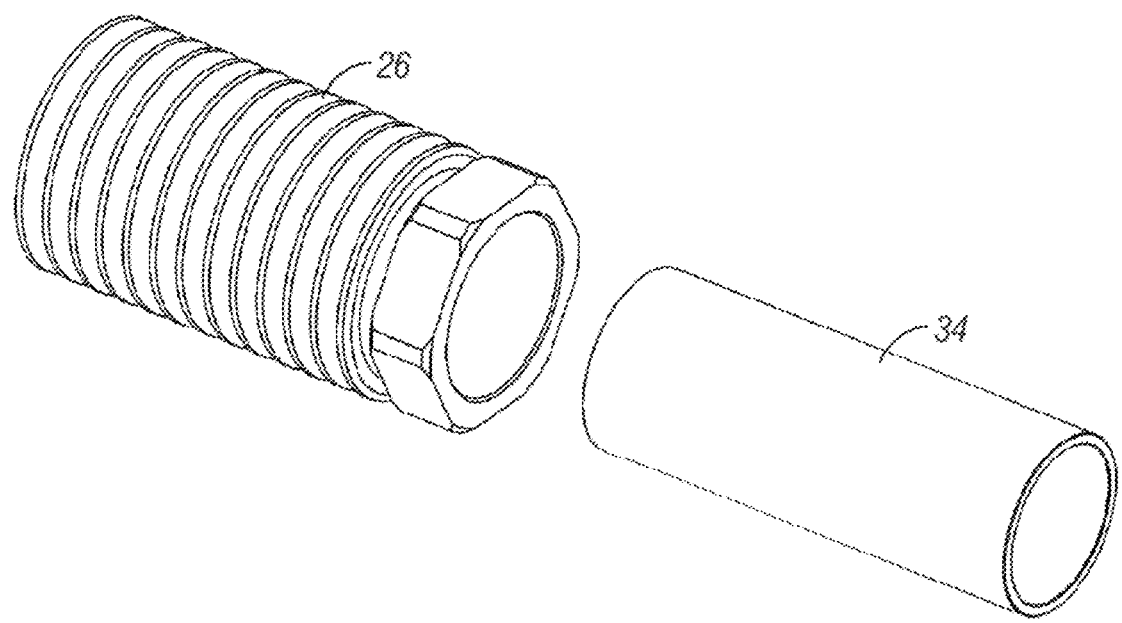
FIG. 4 is an exploded view of the greaseless bushing.
Figure 5:
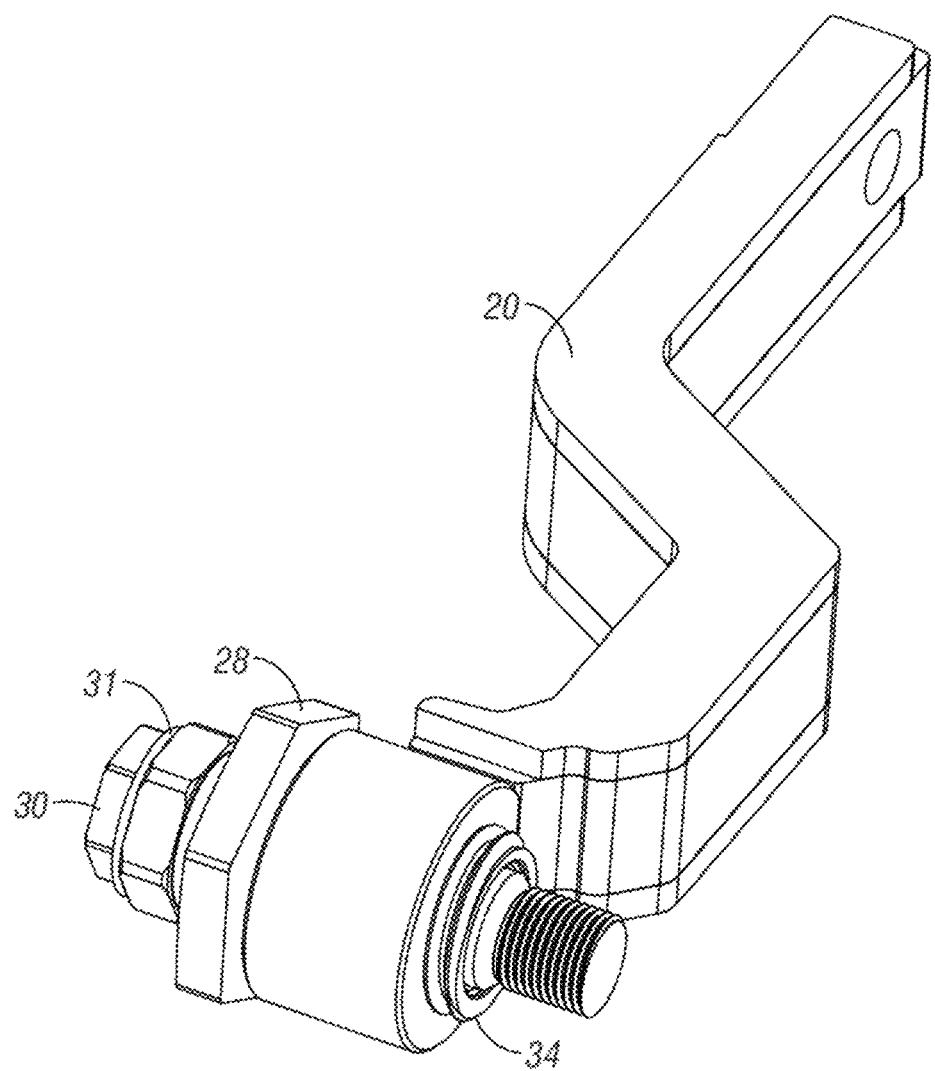
FIG. 5 is enlarged perspective view of a gauge wheel arm having the laterally adjustable greaseless bushing, according to the present invention.
Figure 6:
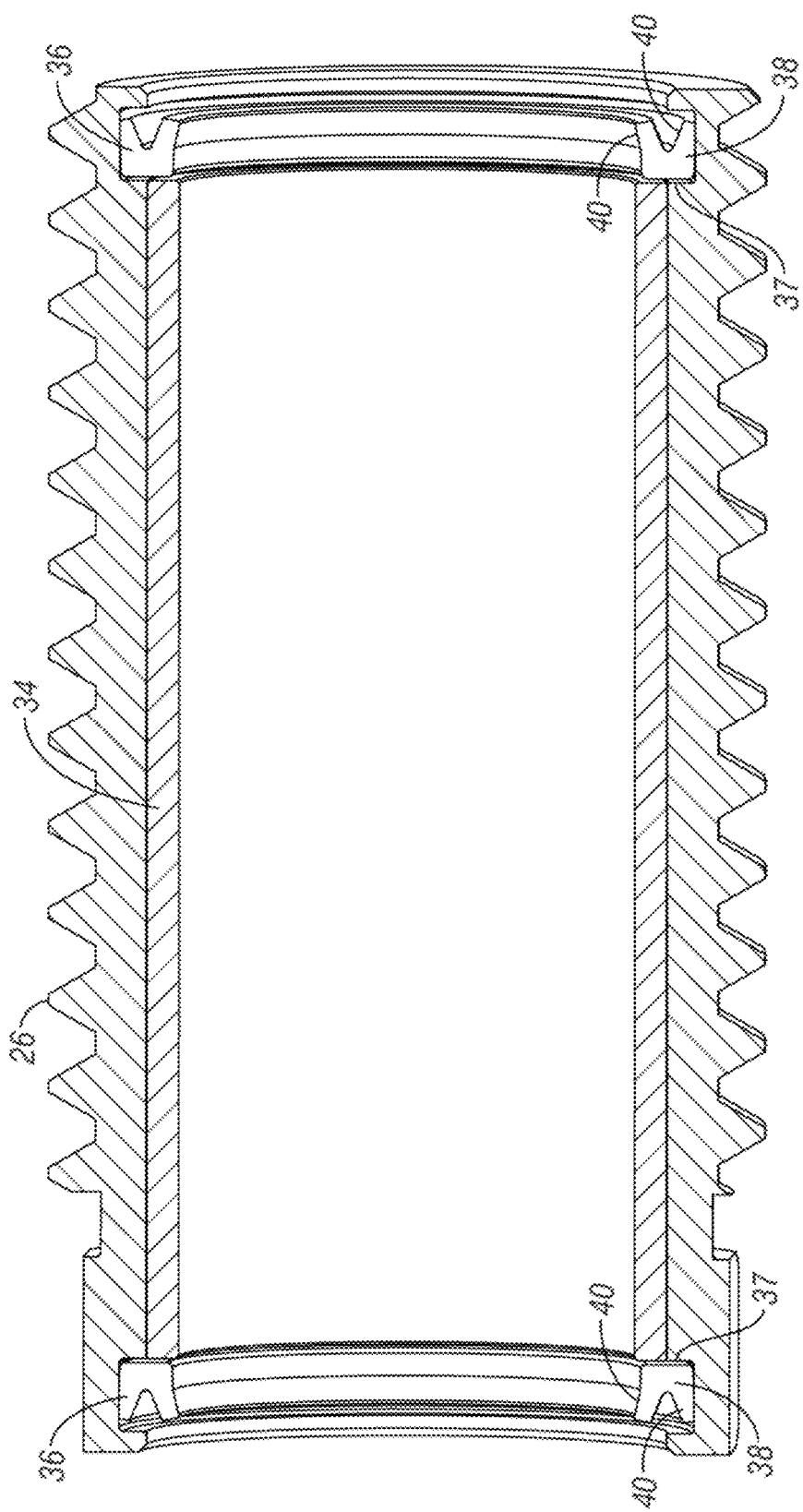
FIG. 6 is a sectional view of the greaseless bushing of FIG. 2A, according to the present invention.
Figure 7:
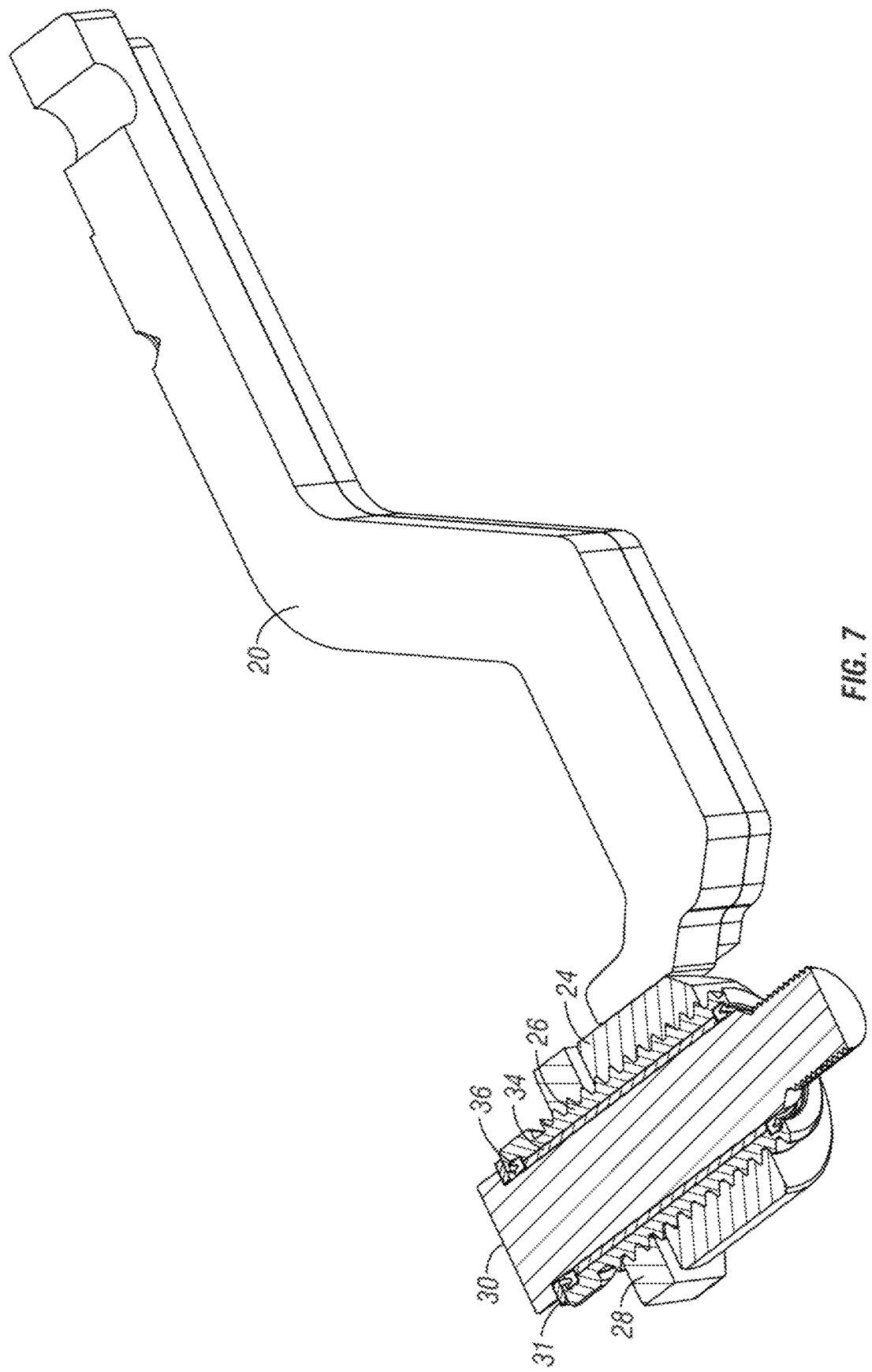
FIG. 7 is a sectional view showing the greaseless bushing of FIG. 2A mounted in the gauge wheel arm.

In an alternative embodiment shown in FIGS. 2A and 6-7, the bushing 26 further includes a pair of annular seals 36 which keeps dust out of the bushings. Each seal 36 is mounted within a groove 37 formed on the interior wall at each end of the bushing 26. Preferably, the seals 36 are a wiper-type seal. As best seen in FIG. 6, the seals 36 have a V-shape in cross section with the base 38 of the seals facing inwardly towards the interior of the bushing, and the leaf 40 of the seals 36 extending axially towards the ends of the bushing 26. The wiper seals 36 perform better than a conventional O-ring seal to prevent migration of dust into the bushing or bearings 26. Such dust contamination of the bushings can eventually cause the link arms to lock or freeze against pivotal action, thus necessitating timely and costly maintenance. The seals 36 do not detrimentally affect the radial action of the bushing 26.

The bushing assembly 26 provides an enhanced level of wear protection to the planter row unit, as compared to a greased bushing, by reducing friction from the rocking action of the gauge wheel arms and from lubrication neglect. Also, farmers will save significant time through the elimination of the need to grease the bushings on the row units, especially during the planting season.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A greaseless bushing assembly for a row planter, having a frame, a pair of discs on the frame to form a furrow in the ground, and a pair of gauge wheels mounted on arms on the frame on opposite sides of the discs, the greaseless bushing assembly comprising:
   an outer tube for threaded externally substantially along its length for threaded receipt in one of the arms of the frame;
   a jam nut on the outer tube threads to adjustably lock the bushing assembly on the one arm; and
   an internal non-metallic sleeve through which a bolt extends for mounting one of the arms to the frame.

2. The greaseless bushing assembly of claim 1 further comprising dust seals on each end of the outer tube.

3. The greaseless bushing assembly of claim 2 wherein the dust seals are wiper-type seals.

4. The greaseless bushing assembly of claim 2 wherein the dust seals are a V-shaped in cross section.

5. The greaseless bushing assembly of claim 1 wherein one end of the outer tube has opposing flat sides for receiving a wrench.

6. A row planter comprising:
   a frame,
   a pair of discs on the frame to form a furrow in the ground;
   a pair of gauge wheels each being adjustably mounted on the frame by an arm;
   a greaseless bushing extending through the arm to mount each gauge wheel onto the frame;
   the bushing having external threads substantially along its length extending into and out of the arm;
   a lock nut on the threads of the bushing adjacent the arm to allow the bushing to be adjustably locked relative the arm; and
   a bolt extending through the bushing and into the frame for mounting the arm to the frame.

7. The row planter of claim 6 wherein the greaseless bushing includes an inner sleeve made of a composite, non-metallic material.

8. The row planter of claim 6 wherein one end of the bushing has opposing flat sides for receiving a wrench.

9. The row planter of claim 6 further comprising dust seals on each end of the bushing.

10. The row planter of claim 9 wherein the dust seals are wiper-type seals.

11. The row planter of claim 9 wherein the dust seals are a V-shaped in cross section.

12. The row planter of claim 6 wherein the greaseless bushing includes an outer threaded tube for threaded receipt in one of the arms of the frame and an internal non-metallic sleeve through which a bolt extends for mounting one of the gauge wheels onto the an arm of the frame.

13. A method of mounting a gauge wheel onto a frame of an agricultural row unit, comprising:
   threading a greaseless bushing having external threads substantially along its full length into one end of a wheel arm mounted on the frame;
   adjustably locking the bushing relative to the arm with a jam nut on the bushing threads; and
   inserting a zerk-free bolt through the greaseless bushing on a wheel arm and into the frame.

14. The method of claim 13 further comprising loosening the jam nut and adjusting the bushing in the wheel arm.

15. The method of claim of claim 14 wherein the greaseless bushing has an outer threaded tube for threaded receipt in one of the arms of the frame to allow for the rotation of the greaseless bushing.

16. The method of claim 13 further comprising loosening the jam nut and rotating the bushing to laterally adjust the bushing relative to the wheel arm.

17. The method of claim 13 further comprising sealing the ends of the bushing to prevent dust entering the bushing.

18. The method of claim 13 further comprising dry lubricating the bushing with an internal, non-metallic composite sleeve.

* * * * *